No. 807,086. PATENTED DEC. 12, 1905.
R. PARKER.
OIL SEPARATOR.
APPLICATION FILED MAY 27, 1904.
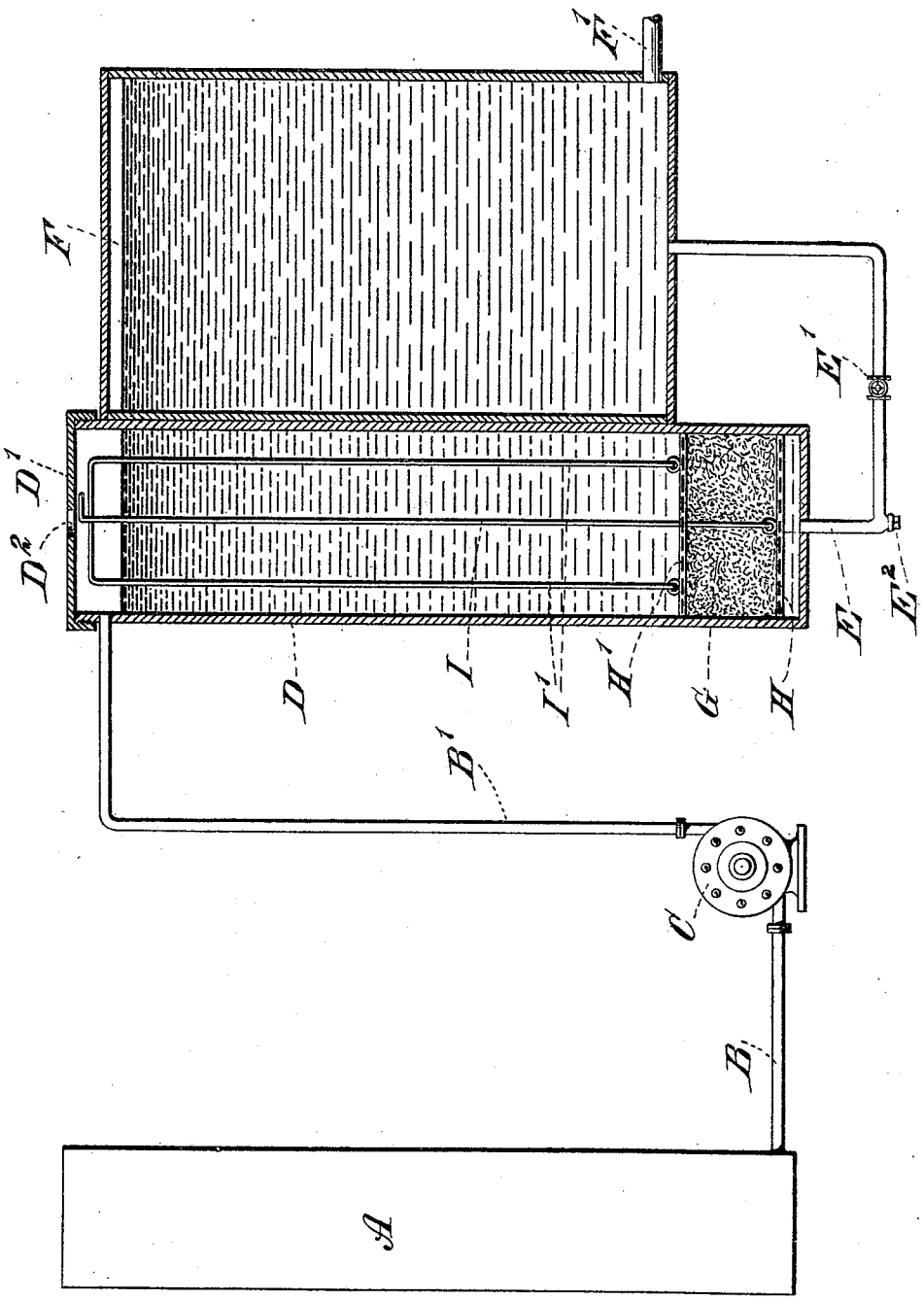
Witnesses
Inventor
Russell Parker
By his Attorneys

UNITED STATES PATENT OFFICE.

RUSSELL PARKER, OF BROOKLYN, NEW YORK, ASSIGNOR TO J. RUSSELL PARKER, OF BROOKLYN, NEW YORK, AND CARL H. PAGE, OF NEW YORK, N. Y.

OIL-SEPARATOR.

No. 807,086.  Specification of Letters Patent.  Patented Dec. 12, 1905.

Application filed May 27, 1904. Serial No. 210,129.

*To all whom it may concern:*

Be it known that I, RUSSELL PARKER, a citizen of the United States, and a resident of the borough of Brooklyn, county of Kings, and State of New York, have invented certain new and useful Improvements in Oil-Separators, of which the following is a specification.

My invention relates to separators such as are used for freeing the condensation-water obtained from the exhaust of steam-engines from the lubricating-oil which is carried away by such exhaust.

The object of my invention is to provide an efficient separator of the above-indicated class which will be especially adapted for use in steam-propelled vehicles.

The invention will be fully described hereinafter and the features of novelty pointed out in the appended claims.

Reference is to be had to the accompanying drawing, which is a sectional elevation illustrating one form or embodiment of my invention.

I have indicated at A a condenser of any suitable construction, which condenser receives the exhaust-steam from the engine. B indicates a pipe leading from said condenser to a pump C; from which another pipe B' conveys the mixture of condensation-water and oil to the separator D, preferably to the upper portion of said separator. From the bottom of the separator a pipe E leads to the bottom of the water-tank F, having a connection F' for supplying water to the boiler or other place of consumption. The upper part of the separator D should not be lower, and certainly not materially lower, than the top of the water-tank F. The lower part of the separator, however, should preferably extend below the bottom of the tank F. A valve E' and a cock E² may be provided for the purpose of disconnecting the separator from the water-tank and of allowing any sediments or impurities to be withdrawn from the separator. Within the separator and in the path of the liquid flowing therethrough I arrange a filter or cushion G, consisting, for instance, of cotton held between two members H H', which may be in the nature of spiders or sieves. Each member is provided with a handle projected upwardly therefrom, one of such handles I being projected centrally from the member H, and the other handle I, which is in the shape of an inverted U, being attached to the member H'. The two handles terminate near the top of the separator D, the cover D' of which is removable, so as to afford access to the said handles. The cover thus prevents the handles and filter from moving upward. In the cover D', I provide a vent-opening D², so that the contents of the separator will only be under atmospheric pressure.

The operation of the device is as follows: The liquid pumped from the condenser A, which liquid is in a heated condition, enters the upper part of the separator and there flows into a body of water which is much cooler. The water always stands at about the same level in the tank F and in the separator D. Whatever oil is contained in the mixture pumped into the separator will float on top of the water and will find no opportunity to enter the tank F, since there is no pressure behind said water. The filter G has been provided as a special protection against the contingency of an unexpected flow of oil to the lower part of the separator. In such case the filter will prevent any oil from passing to the water-tank F. The bottom of the water-tank being above the bottom of the separator-tank in itself acts as a preventive against the conveyance of oil to the water-tank, and the same purpose is also served by connecting the outlet of the separator with the bottom of the water-tank instead of the top thereof, as has generally been done hitherto. Whenever it is desired to clean the separator, the cover D' is removed, and by taking hold of the handles I I' the cushion or filter G is moved within the separator. It will be understood that in this case the filter acts as piston or plunger, and by moving one handle I relatively to the other the cotton or other filter may be compressed, so as to cause its periphery to fit tightly against the inner wall of the separator. By withdrawing the plunger upwardly the contents of the separator will be discharged through the open top and the walls of the separator will be cleaned. Of course in order to insure a perfect result in such cleaning operation the separator should be of uniform cross-section from top to bottom.

I desire it to be understood that I do not deem the cotton plunger or filter to be necessary in all cases nor the means for compressing it, although it is desirable to provide such plunger in order to facilitate the cleaning of the separator. However, the separator may be cleaned by other suitable means, as by opening the cock E² at the bottom, closing the valve E' in the connection to the water-tank, and forcing the cleaning liquid into and through the separator by way of the pipe B.

While I have shown the separator as located outside the water-tank, I desire it to be understood that this arrangement is not essential. Preferably, however, as stated, the bottom of the separator should be below the bottom of the water-tank.

I claim as my invenion and desire to secure by Letters Patent—

1. The combination, with the separator-tank, of a pervious plunger located therein, movable members between which said plunger is held, and handles connected with said members and terminating adjacent to each other.

2. The combination with the separator-tank of substantially uniform cross-section from one end to the other, of a filter normally located near one end of the said tank, two apertured members between which said filter is held, and handles connected with said members and extending lengthwise of the separator-tank to the other end thereof, to permit of compressing said filter and of moving it lengthwise of the tank in contact with the walls thereof.

3. The combination with the separator-tank D and the water-tank F the lower portions of which are connected with each other, said separator-tank extending below the level of the water-tank, of a filter G extending within that portion of the separator-tank which is below the level of the water-tank, the outlet of the water-tank being at the lower portion thereof, yet above the level of the filter-bottom.

In testimony whereof I have hereunto set my hand in the presence of two subscribing witnesses.

RUSSELL PARKER.

Witnesses:
 JOHN LOTKA,
 JOHN A. KEHLENBECK.